Patented Oct. 20, 1953

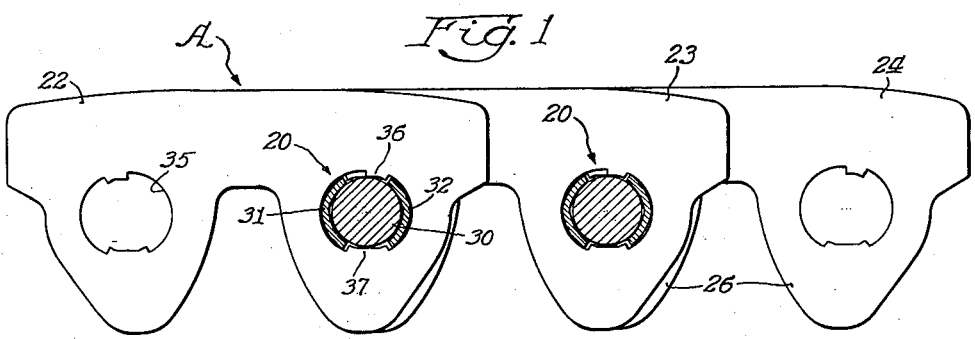
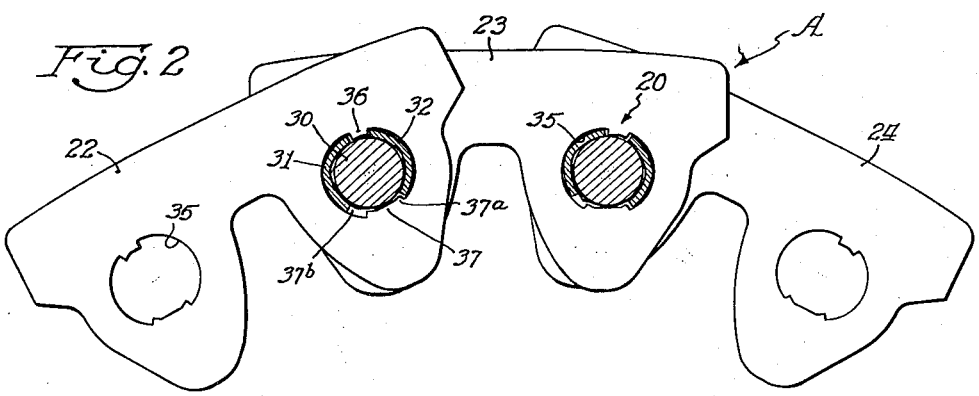
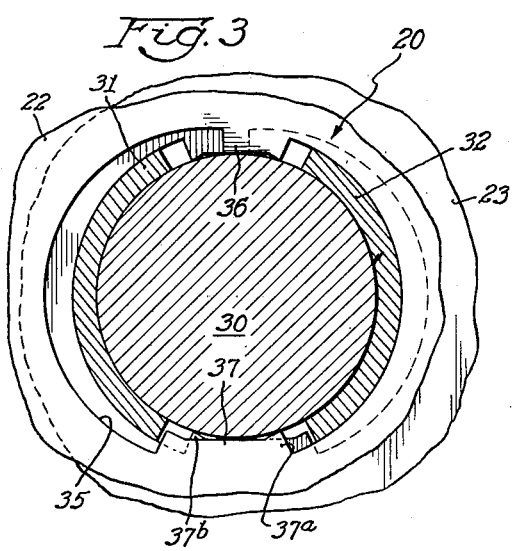
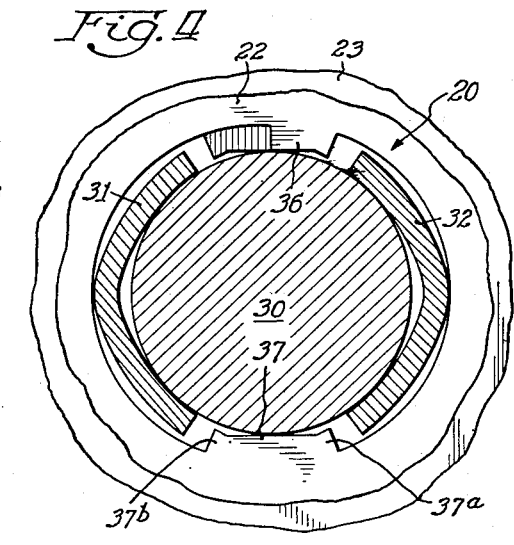

2,655,816

UNITED STATES PATENT OFFICE 2,655,816

SPRING BUSHED CHAIN

Earl F. Riopelle, Detroit, Mich., assignor to Morse Chain Company, Ithaca, N. Y., a corporation of New York Application May 21, 1949, Serial No. 94,661

11 Claims. (Cl. 74—251)

This invention relates, in general, to chain constructions advantageously employed for power transmission equipment and is particularly concerned with silent chains providing a means for automatic slack take-up.

A silent chain construction incorporating an automatic slack take-up as contemplated by this invention is particularly advantageous because it eliminates the necessity of accurate and fine adjustments as to the length of the chain when first installed and substantially relieves the necessity of periodic adjustment to compensate for wear and other variable factors involved in power transmission equipment. Moreover, the chain will always have proper tension which will eliminate vibration and objectionable noise in the operation thereof.

It is recognized that in the prior art numerous attempts have been made to provide a silent chain incorporating an automatic slack take-up feature of this general class and efforts have been made to overcome the various deficiencies found in such prior art structures, but to the best of the applicant's knowledge the prior art structures have had only limited success, and have been accorded only limited recognition. It is believed that this fact results from apparent deficiencies of the prior art structures, their nonadaptability for universal application and their expensive construction which so greatly increased the cost as to seriously handicap sales acceptance.

The present improvements in silent chains, particularly characterized as having the automatic slack take-up feature contemplated by this invention, are directed to simplify their construction and their mode of operation and also to provide a silent chain construction, incorporating the aforementioned features, which may readily and conveniently be employed universally to various types and sizes of silent chains presently employed. Moreover, the present device seeks to employ conventional parts wherever necessary and expedient, thereby to effect a substantial reduction in cost over prevailing types of silent chains of this general class.

Accordingly, an object and accomplishment of the invention is to provide a silent chain construction comprising a plurality of chain links interconnected by suitable pins, said pins having operatively associated therewith double liners, said double liners defining bushings with a curvature whose radii vary and are less than the diameter of the pin so that, as the chain is loaded, the pin is forced to nest in the bushing by deflecting or decreasing the curvature of the bushing, the foregoing construction being particularly characterized in its operation by a spring action of each joint.

A further object and accomplishment of the invention is to provide a silent chain construction incorporating the feature of an automatic slack take-up hereinbefore described and wherein the spring action, or take-up, is controlled designwise by the difference in the curvature of the pin and bushing curvature and wherein the load required to force the pin to nest in the bushing is controlled by the thickness of the bushing.

Another object and accomplishment of the invention is to provide an automatic slack take-up for incorporation in silent chains, said automatic slack take-up being designed for advantageous employment in power transmission equipment and which shall have a novel and compact arrangement of parts wherein said parts can be readily assembled and serviced.

The invention seeks, as a further object and accomplishment, to provide a silent chain construction incorporating an automatic slack take-up as contemplated herein and characterized by an arrangement of parts to more advantageously and satisfactorily perform the function required of it and adapted to provide a compact unit which will successfully combine the factors of structural simplicity and durability, and yet be economical to manufacture.

An important object and accomplishment of the invention is to provide an automatic slack take-up for silent chains, said automatic slack take-up being particularly and advantageously applicable for employment in power transmission equipment where freedom from vibration and objectionable noise is desired, said automatic slack take-up being particularly characterized in its simple but sturdy construction and in its convenient fool-proof and safe operation.

Another particular object and accomplishment of the invention is to provide a silent chain having an automatic slack take-up by co-relating and especially designing the various elements of such automatic slack take-up whereby there shall be cooperation between said improved elements as will best serve the purpose of providing an efficient silent chain construction capable of being manufactured at low cost and yet giving the maximum of service in use.

Additional objects, features and advantages of the invention disclosed herein will be apparent to persons skilled in the art after the construction and operation are understood from the within description.

It is preferred to accomplish the various objects of the invention and to practice the same in substantially the manner as hereinafter more fully described, and, as more particularly pointed out in the appended claims.

With the above and other incidental objects in view, the invention has other marked improvements and superiorities which radically distinguishes it from presently known structures, these improvements in the invention residing in the novel construction and the cooperating function of the parts thereof, the combination of parts and the arrangement thereof as illustrated in the drawing and which will be more fully described hereinafter and particularly pointed out in the claims.

In the accompanying drawing on which there are preferred embodiments of the invention, Fig. 1 is a side elevational view of a silent chain construction embodying the features of the present invention, and with some of the parts thereof shown in section to more clearly illustrate the construction thereof and the relative disposition of parts when the chain is not flexed;

Fig. 2 is a side elevational view of a silent chain construction depicted in Fig. 1 but showing the relative disposition of the parts thereof when the chain is in a flexed position;

Fig. 3 is a fragmentary view of the automatic slack take-up assembly contemplated by this invention and illustrates the relative disposition of the parts when a load is placed upon the chain; and Fig. 4 is a fragmentary sectional view of the automatic slack take-up assembly depicted in Fig. 3 and illustrates the relative disposition of the parts when no load is placed upon the chain.

The drawing is to be understood as being more or less of a schematic character for the purpose of illustrating or disclosing typical or preferred forms of the improvements contemplated herein and in the drawing like reference characters identify the same parts in the several views.

As one possible example of advantageous employment of the contemplated automatic slack take-up assembly, reference is made to the drawing wherein there is illustrated a silent chain construction having incorporated therein the especially designed automatic slack take-up assembly with which the invention is particularly concerned and designated in its entirety by the numeral 20 as being operatively associated with a conventional silent chain designated in its entirety by the letter A, said silent chain A being adjunctively employed, for example, to conventional power transmission equipment (not shown) which may include timing chains for automotive vehicles but is not necessarily limited to the suggested application thereof.

The illustrated silent chain construction may comprise a plurality of chain links 22, 23 and 24 interlaced in the conventional manner, the respective chain links being provided with toothed formations 26 adaptable for interengagement with suitable sprocket teeth (not shown).

Although only the important sprocket links are illustrated for the purpose of the explanation of the operation of the automatic slack take-up means, it is obvious that the illustrated chain may have any desirable number of links to define a proper width of chain determined by the requirements of load. Moreover, the pitch of the chain may be variable since the automatic slack take-up feature 20 contemplated by this invention may be advantageously employed on various sized silent chains.

Suffice it to say, since the invention is not particularly concerned with the precise construction of the illustrated silent chain structure and/or its associated parts, they will not be further described in detail, and it is deemed sufficient for all intentions and purposes herein contained to show only portions thereof adjacent to and cooperating with the automatic slack take-up assembly 20 contemplated herein. It is to be understood that details of construction of such silent chains and/or their associated parts may be modified to suit particular conditions or to satisfy the engineering genius of various competitive manufacturers and in some instances the automatic slack take-up assembly contemplated herein may be advantageously employed in other types of chains, and I do not wish to be limited to the construction of these elements as set forth, except where such construction particularly relates to or is concerned with the invention contemplated herein.

Having thus described, by way of example, a possible adaptation of the automatic take-up assembly 20 as contemplated herein and having described the general environment surrounding the adaptation, the specific construction and cooperating functions of the parts of said automatic take-up assembly with which the present invention is particularly concerned, will now be described in detail.

In the exemplary embodiment of the invention depicted in Figs. 1 and 2, the silent chain structure A including the automatic slack take-up assembly 20 with which the present invention is particularly concerned comprises, in general, a plurality of chain links, as at 22, 23 and 24 interconnected by suitable pins 30 of identical construction, each of said pins having operatively associated therewith double linears 31 and 32, said double liners each defining bushings with a curvature whose radii vary in length and are less than the diameter of their associated pin so that, when load is placed upon the chain, the pin is forced to nest in the bushing by deflecting the curvature of the bushing, the foregoing construction being particularly characterized in its operation by a spring action of each joint responsive to the load placed upon the chain. Thus it can be seen; that the curvature of the bushings whose radii vary will determine a plurality of focal points or centers of curvature which are different from the center of curvature or axis of the pin when the load is not on the chain; that the focal points of the bushing will coincide with the axis of the pin when the maximum load is placed on the chain; and that the location of the focal points of the bushing with respect to each other and to the axis of the pin will vary depending upon the magnitude of the load placed on the chain.

In accordance with the construction of the present invention the pins 30 are arranged so that they are free to float in order to advantageously accommodate the flexure of the chain to various positions required.

In adverting to Figs. 1 and 2, it can be seen that each of the chain links are provided with suitable apertures as at 35 and since the respective apertures are all similar in construction, it is deemed expedient to only describe one in detail. For example, the aperture 35 is provided with inwardly projecting protuberances defining stops 36 and 37 arranged so that the bushings 31 and 32 may be held in their respective operative position and, more important, to provide a means for causing the bushings to revolve around the pin, in a restricted sense, to follow the path of the load. This action is clearly illustrated in Fig. 1 wherein the subject construction is shown in its straight line position and it can be seen that the bushings 31 and 32 are disposed in the direct line of the pull which would be either to the left or to the right of the chain construction disclosed in Fig. 1.

Particular attention is invited to Fig. 2 wherein the relative disposition of the bushings 31 and 32, when the chain is in its flexed position, is such that the bushings are again in the path of the load.

In operation, the movement of the respective bushings 31 and 32 is accomplished by the particular disposition of the stops 36 and 37 so that in one link (Fig. 1) a portion 37a of the stop 37 will cause the rotation about the axis of the pin 30 of the bushing 32 when the chain is flexed as shown in Fig. 2. In Fig. 2, it can be seen that the portion 37b of the stop 37 which, incidentally, is disposed in the link 23 reacts upon the bushing 31 to move it into its proper operative position in line with the path of the load upon the chain.

Thus, it can be seen that the automatic slack take-up assembly 20 with which the present invention is particularly concerned, provides the important feature of presenting the flexing action of the chain in a proper operating position in the line of the path of the load placed upon the chain, thereby to accommodate varying degrees of flexure of the chain in its operation in connection with power transmission equipment.

Particular attention is invited to Fig. 3 which is a fragmentary view of the automatic slack take-up assembly 20 contemplated by this invention and illustrates the relative disposition of the parts when a load is placed upon the chain. It can be seen that the bushings 31 and 32 tend to hug the pin 30 to provide a solid drive connection throughout the chain.

In Fig. 4 a fragmentary sectional elevational view of the automatic slack take-up assembly 20 illustrates the relative disposition of the parts when there is no load upon the chain. This may be the condition of the chain on the loose side of the chain after it has left the driving sprocket, while the disposition of the parts illustrated in Fig. 3 illustrate their respective positions on the tight side of the chain during driving operation of the chain. It can be seen that the automatic slack take-up assembly contemplated by this invention will effectively reduce vibration and substantially eliminate objectionable noise which, heretofore, was present on the loose side of silent chains.

It is notable that the spring action of the automatic slack take-up assembly 20 may be effectively and advantageously controlled design-wise by the proper and judicious selection of a particular size of pin and a particular bushing curvature. Moreover, the load required to force a selected pin to nest in a selected bushing may be effectively and advantageously controlled by the proper and judicious determination of the thickness of the bushing.

In accordance with the construction of the present invention the parts and their relative disposition effectively provide a compact arrangement of parts which can be readily assembled and serviced. This is an important feature in that chains of this type must, of necessity, be produced under mass production manufacturing principles.

From the foregoing disclosures it may be observed that I have provided an improved silent chain construction including an automatic slack take-up feature which effectively fulfills the objects thereof as hereinbefore set forth and which provides numerous advantages which may be summarized as follows:

1. Structurally simple, efficient and durable;
2. Economical to manufacture and readily adaptable to mass production manufacturing principles; and
3. The provision of an improved automatic slack take-up assembly particularly and advantageously applicable for employment in power transmission equipment where freedom from vibration and objectionable noise is desired.

While I have illustrated a preferred embodiment of my invention, many modifications may be made without departing from the spirit of the invention, and I do not wish to be limited to the precise details of construction set forth but wish to avail myself of all changes within the scope of the appended claims.

I claim:

1. A silent chain structure including an automatic slack take-up assembly, comprising a plurality of chain links interconnected by pins of identical construction, each of said pins having operatively associated therewith double liners each defining a bushing with a curvature whose radii vary in length and are less than the diameter of their associated pin and arranged so that the pin is forced to nest in the bushing by deflecting the curvature of the bushing when load is placed upon the chain, said arrangement being particularly characterized in its operation by a spring action of each joint responsive to the load place upon the chain.

2. A silent chain structure including an automatic slack take-up assembly, comprising a plurality of chain links, a plurality of pins of identical construction operatively associated with said chain links to interconnect the same, and bushing means operatively associated with each pin and having a curvature whose radii vary in length and are less than the diameter of a respective associated pin, said arrangement being particularly characterized in its operation whereby the pin is forced to nest in the bushing by deflecting the curvature of the bushing when a load is placed upon the chain, thereby imparting a spring action at each joint of the chain responsive to the load placed upon the chain.

3. A slack take-up assembly for silent chains having pins for interconnecting the chain links, comprising bushing means operatively associated with each pin and having a peripheral curvature different from the peripheral curvature of a respective associated pin and arranged so that the bushing has two points of abutment with said pin which determine a volume defined by non-contiguous areas of said pin and said bushing between said points of abutment, said volume being equal throughout the length of the bushing and varying in accordance with the magnitude of the load on said chain.

4. An automatic slack take-up assembly for silent chains having pins for interconnecting the chain links, comprising bushing means operatively associated with each pin and having a curvature having radii determining focal points different from points on the axis of the bushing, said radii being less than the diameter of a respective associated pin, means associated with the chain links for causing the bushing to revolve around their respective associated pin within range of the flexure of the chain, thereby to follow the path of the load upon the chain, said arrangement being particularly characterized in its operation whereby a respective pin is forced to nest in the bushing by deflecting the curvature of the bushing when load is placed upon the chain, thereby imparting a spring action at each joint of the chain responsive to the load placed upon the chain.

5. In a slack take-up assembly for silent chains having pins for interconnecting the chain links, double bushing means operatively associated with each pin and having a peripheral curvature different from the peripheral curvature of a respective associated pin and arranged so that said bushing has two contiguous lines with said pin defining an area of non-contiguity with said pin at the extreme position wherein no load is on the chain, said area of non-contiguity being equal throughout the length of the bushing and varying with the magnitude of the load on the chain, said bushing being completely contiguous with said pin at the other extreme position when maximum load is placed on the chain.

6. In an automatic slack take-up assembly for silent chains, pins for interconnecting the chain links, double bushing means operatively associated with each pin and having a curvature whose radii vary in length and are less than the diameter of a respective associated pin, together with means associated with the chain links for causing the bushing to revolve around their respective associated pin within range of the flexure of the chain, thereby to follow the path of the load upon the chain, said arrangement being particularly characterized in its operation whereby a respective pin is forced to nest in the bushing by deflecting the curvature of the bushing when load is placed upon the chain, thereby imparting a spring action at each joint of the chain responsive to the load placed upon the chain.

7. In a silent chain structure including an automatic slack take-up assembly, the combination of a plurality of chain links, pins of identical construction for interconnecting said chain links, and double liners each defining a bushing with a curvature whose radii vary in length and are less than the diameter of their associated pin and arranged so that the pin is forced to nest in the bushing by deflecting the curvature of the bushing when load is placed upon the chain.

8. In an automatic slack take-up assembly for silent chains having pins for interconnecting the chain links, the combination of bushing means operatively associated with each pin and having a curvature whose radii vary in length and are less than the diameter of a respective associated pin, and means associated with the chain links for causing the bushing to revolve around their respective associated pin within range of the flexure of the chain, thereby to follow the path of the load upon the chain.

9. A slack take-up assembly for silent chains having pins for interconnecting the chain links, comprising bushing means operatively associated with each pin and having a curvature whose radii vary in length and determine centers of curvature which define lines parallel to the axis of the pin in one extreme position less than the diameter of a respective associated pin and arranged so that the pin is forced to nest in the bushing by deflecting the curvature of the bushing thereby causing the lines defined by the center of curvature of the bushing to coincide with the axis of the pin in a second extreme position when maximum load is placed upon the chain, and wherein the spring take-up action thereof is controlled design-wise by the difference in the curvature of the pin and bushing curvature and wherein the magnitude of the load required to force the pin to nest in the bushing is controlled by the thickness of the bushing so that the location of said lines determined by the center of curvature of the bushing varies between said extreme positions.

10. In an automatic slack take-up assembly for silent chains having pins for interconnecting the chain links, the combination of bushing means operatively associated with each pin and having a curvature whose radii vary in length and determine centers of curvature which define lines parallel to the axis of the pin in one extreme position and are less than the diameter of a respective associated pin and arranged so that the pin is forced to nest in the bushing by deflecting the curvature of the bushing thereby causing the lines defined by the center of curvature to coincide with the axis of the pin in a second extreme position when maximum load is placed on the chain, and means associated with the chain links for causing the bushing means to revolve around their respective associated pin within the range of the flexure of the chain, thereby to follow the load upon the chain, and wherein the spring take-up action thereof is controlled design-wise by the difference in the curvature of the pin and bushing curvature and wherein the magnitude of the load required to force the pin to nest in the bushing is controlled by the thickness of the bushing thereby varying the locations of the lines determined by the center of curvature between said extreme positions.

11. A silent chain structure including an automatic slack take-up assembly, comprising a plurality of chain links, a plurality of pins of identical construction operatively associated with said chain links to interconnect the same, and bushing means operatively associated with each pin and having a curvature whose radii vary in length and determine centers of curvature which define lines parallel to the axis of the pin in one extreme position, said radii being less than the diameter of a respective associated pin, said arrangement being particularly characterized in its operation whereby the pin is forced to nest in the bushing by deflecting the curvature of the bushing thereby causing the lines defined by the centers of curvature to coincide with the axis of the pin in a second extreme position when a maximum load is placed upon the chain, thereby imparting a spring action at each joint of the chain responsive to the load placed upon the chain, and wherein the spring take-up action thereof is controlled design-wise by the difference in the curvature of the pin and bushing curvature and wherein the load required to force the pin to nest in the bushing is controlled by the thickness of the bushing thereby varying the location of the lines determined by the centers of curvature between extreme positions.

EARL F. RIOPELLE.

References Cited in the file of this patent

UNITED STATES PATENTS

| Number | Name | Date |
| --- | --- | --- |
| 1,384,173 | Wikander | July 12, 1921 |
| 1,419,891 | Oakes | June 13, 1922 |
| 1,780,040 | Pierce | Oct. 28, 1930 |
| 2,047,833 | Pierce | July 14, 1936 |
| 2,324,640 | Perry | July 20, 1943 |
| 2,415,188 | Olander | Feb. 4, 1947 |